(12) United States Patent
Adams (10) Patent No.: US 8,146,935 B1
(45) Date of Patent: Apr. 3, 2012

(54) VEHICLE STEP-UP AND PROTECTION DEVICE

(76) Inventor: Gary Adams, Garland, TX (US)

( * ) Notice: Subject to any disclaimer, the term of this patent is extended or adjusted under 35 U.S.C. 154(b) by 0 days.

(21) Appl. No.: 13/073,822

(22) Filed: Mar. 28, 2011

(51) Int. Cl.
*B60R 19/38* (2006.01)

(52) U.S. Cl. ............... 280/166; 280/164.1; 280/770; 293/118; 296/187.12

(58) Field of Classification Search ............ 280/163, 280/164.1, 166, 770; 293/118; 296/187.12
See application file for complete search history.

(56) References Cited

U.S. PATENT DOCUMENTS

| | | | |
|---|---|---|---|
| 7,017,927 B2 | 3/2006 | Henderson et al. | |
| 7,118,120 B2 | 10/2006 | Lee et al. | |
| 7,377,531 B2 | 5/2008 | Fabiano et al. | |
| 7,487,986 B2 | 2/2009 | Leitner et al. | |
| 7,513,565 B2 | 4/2009 | Watson | |
| 7,584,975 B2 | 9/2009 | Leitner | |
| 2006/0181049 A1 | 8/2006 | Kobayashi et al. | |
| 2008/0061566 A1* | 3/2008 | Ryan et al. | 293/118 |
| 2009/0295115 A1 | 12/2009 | Yang et al. | |

* cited by examiner

*Primary Examiner* — J. Allen Shriver, II
*Assistant Examiner* — James Triggs
(74) *Attorney, Agent, or Firm* — Morgan Law Offices, PLC (57) ABSTRACT

A device for a high-clearance motor vehicle is provided. Preferably, the device comprises an elongated step; and one or more supports, wherein each of the one or more supports includes: a lift bar; a base; and an actuator; wherein the base holds the actuator and the lift bar is pivotally attached to the base on a distal end and to the step on the opposite end; and wherein, when the device is operated, depending on user selection, the actuator either lowers the lift bar causing the step to be positioned for use or raises the lift bar causing the step to be retracted, and if retracted, the step blocks at least one door of the motor vehicle making it difficult to steal the motor vehicle. Additionally, when the step is retracted, the step impedes "ding" damage from an adjacent motor vehicle.

10 Claims, 8 Drawing Sheets

VEHICLE STEP-UP AND PROTECTION DEVICE

FIELD OF THE INVENTION

The present invention relates to the field of motor vehicle accessories, and, more particularly, to a motorized step for a motor vehicle that acts as a vehicle protection device when retracted.

BACKGROUND

In recent years, larger motor vehicles such as pick-up trucks and SUVs have become popular. However, these vehicles have higher ground clearance making it more difficult to enter the vehicle. While many of these vehicles have running boards to make stepping up into the vehicle somewhat easier, these are placed too high for many individuals and can collect dirt and mud during driving which is then tracked into the vehicle. In the winter, snow and ice can build up on the running boards, creating a potentially dangerous situation.

Various patents exist for step-up devices to make entry into a motor vehicle easier. For example, U.S. Pat. No. 7,584,975 to Leitner, entitled Retractable Vehicle Step, discloses a vehicle step having a single arm that allows the step to be positioned and to retract. As another example, U.S. Pat. No. 7,017,937 to Henderson et al., entitled Power Operated Running Board, discloses a running board that can be automatically positioned or retracted. In both of these patents, when the step is retracted, it is placed into a position below the vehicle door.

SUMMARY OF THE INVENTION

According to preferred embodiments of the present invention, a step-up and protection device for a high-clearance motor vehicle is provided. Preferably, one such device is installed along the driver-side of the motor vehicle and an another such device is installed along the passenger-side of the motor vehicle. Preferably, the devices can be activated by remote control or by the driver of the vehicle.

Preferably, the device comprises an elongated step; and one or more supports, wherein each of the one or more supports includes: a lift bar; a base; and an electric actuator; wherein the base holds the actuator and the lift bar is pivotally attached to the base on a distal end and to the step on the opposite end; and wherein, when the device is operated, depending on user selection, the actuator either lowers the lift bar causing the step to be positioned or raises the lift bar causing the step to be retracted, and if retracted, the step blocks at least one door of the motor vehicle.

By blocking the door of the motor vehicle from opening, the device acts as a security device making it difficult to steal the motor vehicle. Additionally, when the step is retracted, the step impedes potential "ding" damage from an adjacent motor vehicle by shielding the motor vehicle from damage from the door of the adjacent motor vehicle.

These and other aspects, features, and advantages of the present invention will become apparent from the following detailed description of preferred embodiments, which is to be read in connection with the accompanying drawings.

BRIEF DESCRIPTION OF THE DRAWINGS

FIGS. 7 and 8A-B show the device in use to prevent a motor vehicle from being dinged.

DETAILED DESCRIPTION

Figure 1:
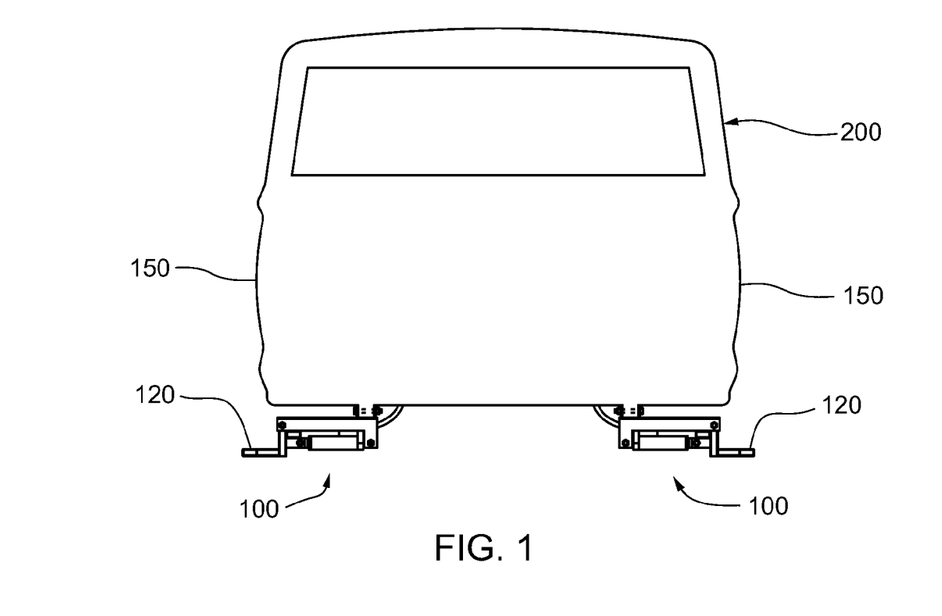
FIG. 1 shows a pair of exemplary step-up protection devices on a vehicle in the step-up position.
Figure 2:
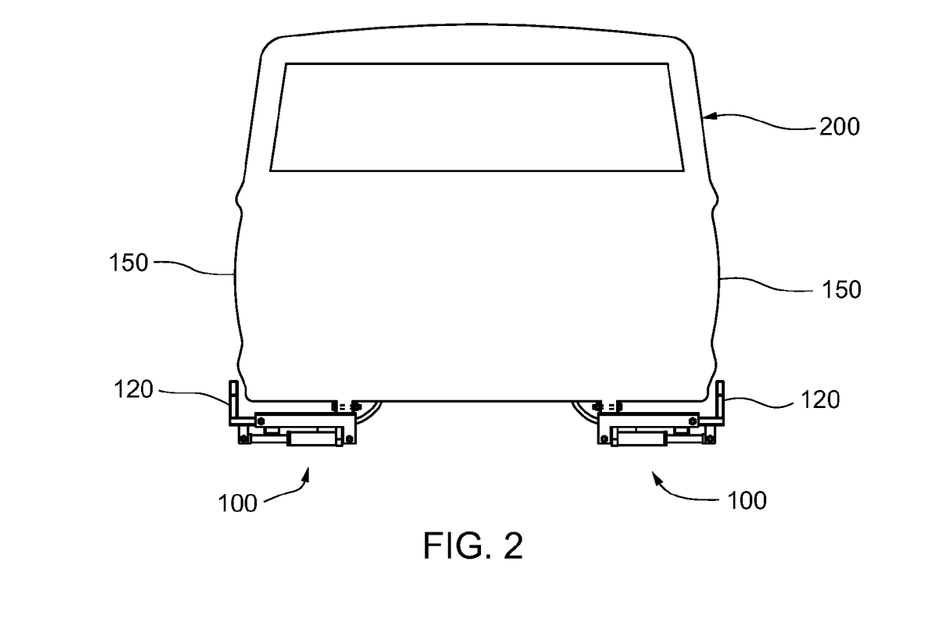
FIG. 2 shows the exemplary devices on the vehicle in the retracted position.

FIGS. 1 and 2 illustrate a pair of exemplary step-up protection devices 100 installed on a motor vehicle 200. As depicted, one such device 100 is installed along the driver-side of the motor vehicle 200 and another such device 100 is installed along the passenger-side of the motor vehicle 200. FIG. 1 shows the exemplary devices 100 in the step-up position; FIG. 2 shows the devices 100 in the retracted position.

Figure 3:
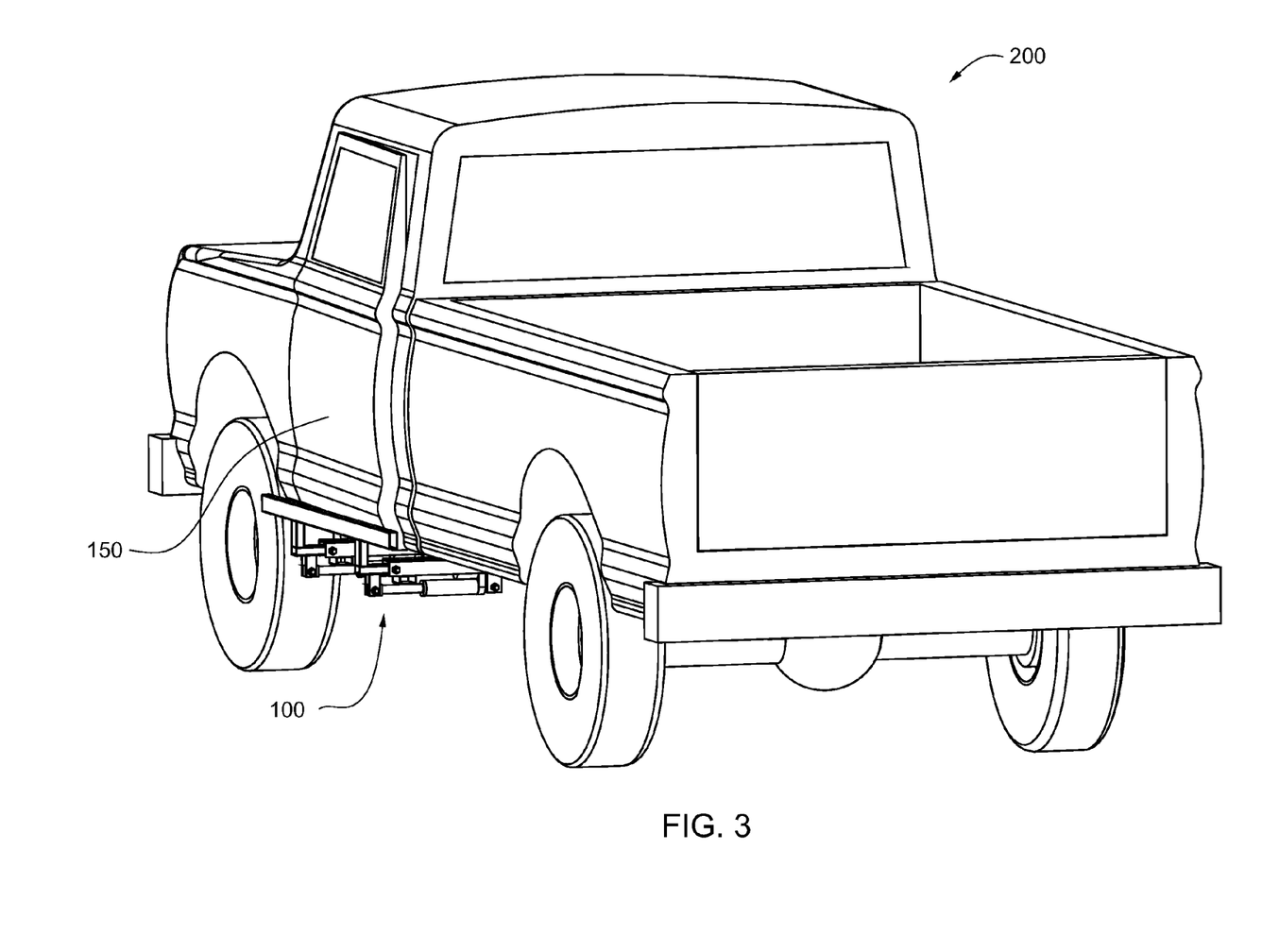
FIG. 3 shows a side view of a vehicle with an exemplary step-up protection device in the retracted position.

As will be described in greater detail, when a person wishes to enter or leave the vehicle 200, a device 100 on the desired entry side is activated such as to cause the step to be positioned. When not being used as a step-up device, the device 100 is retracted. When in the retracted position, the device 100 blocks the door 150 of the vehicle 200 from opening making it difficult to steal the motor vehicle. FIG. 3 illustrates a driver side view of the vehicle 200 with an exemplary step-up protection device 100 in the retracted position, more clearly illustrating this aspect of the invention. Additionally, when the step is retracted, the step impedes "ding" damage from an adjacent motor vehicle.

Preferably, the devices 100 are powered by the battery of the motor vehicle 200, and can be activated by remote control or by the driver of the vehicle from a control inside the motor vehicle 200. Preferably, the user will be able to select whether to activate either the device 100 on the driver side or the one on the passenger side, or both; and select whether the device 100 is to be positioned toward the step-up position or retracted.

Figure 4A:
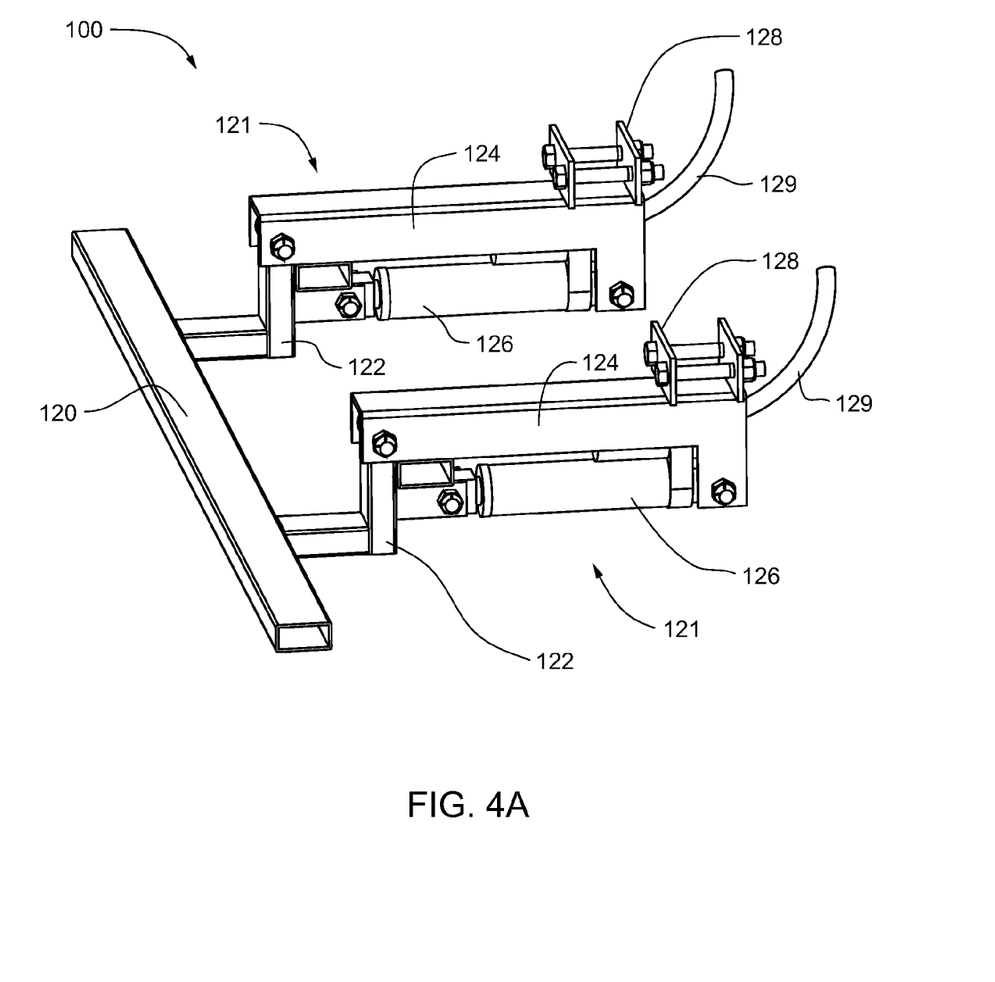
FIG. 4A shows a close-up view of the exemplary step-up protection device in the step-up position.
Figure 4B:
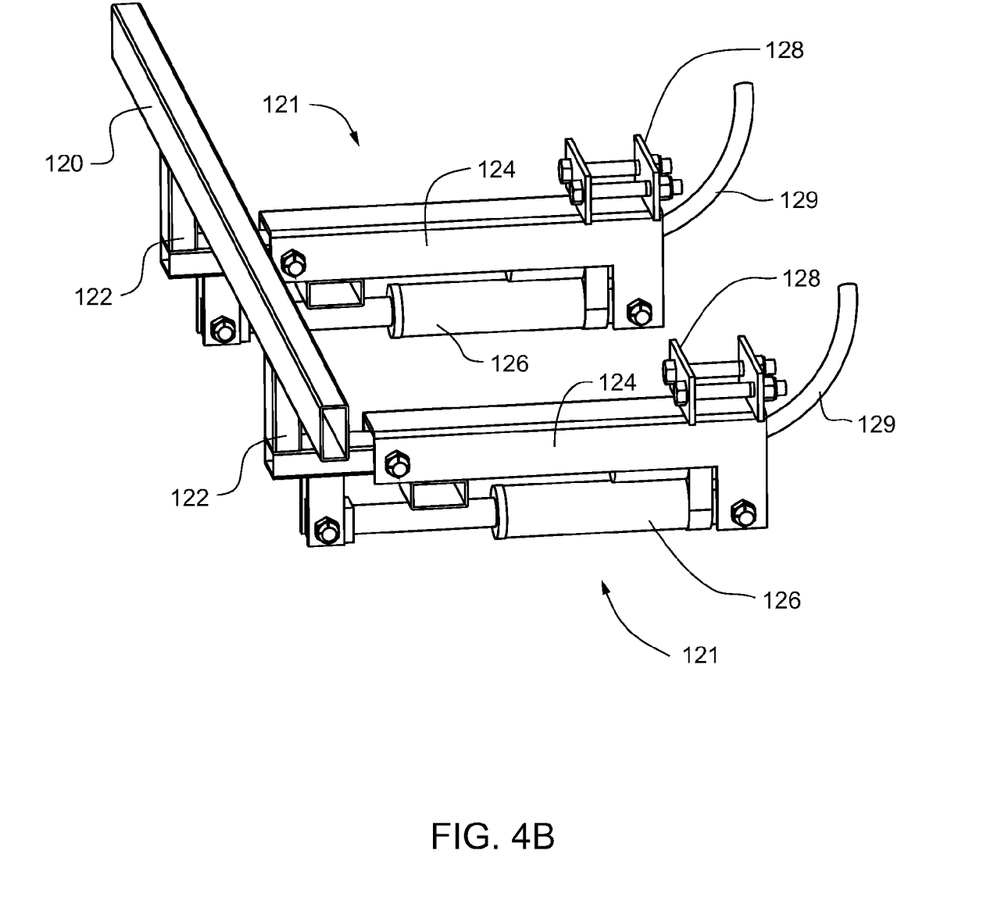
FIG. 4B shows a close-up view of the exemplary step-up protection device in the refracted position.
Figure 5:
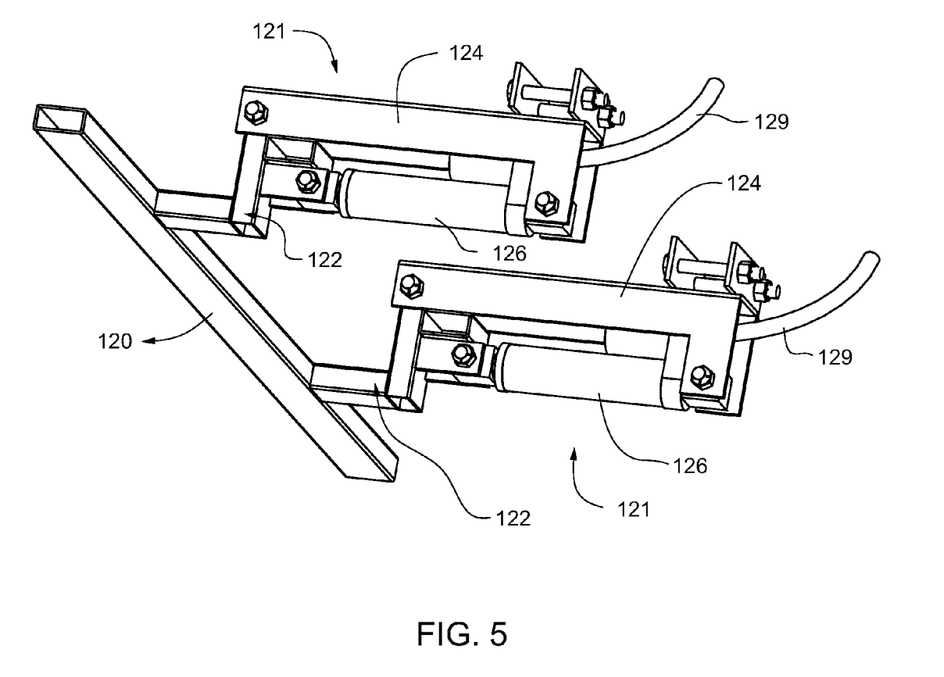
FIG. 5 shows another view of the exemplary step-up protection device in the step-up position.

FIG. 4 shows a close-up view of the device 100. As illustrated, the device 100 is in the step-up position. As shown, the device 100 includes an elongated step 120; and one or more supports 121, wherein each of the one or more supports 121 includes: a lift bar 122; a base 124; and an actuator 126; wherein the base 124 holds the actuator 126 and the lift bar 122 is attached to the base 124 on a distal end and to the step on an opposite end. In operation, when the device 100 is activated, depending on user selection, the actuator 126 either lowers the lift bar 122 causing the step 120 to be positioned for use or raises the lift bar 122 causing the step to be retracted, and if retracted, the step 120 blocks at least one door of the motor vehicle 200. Additional views of the exemplary device 100 are shown in FIG. 4B and FIG. 5.

Figure 6A:
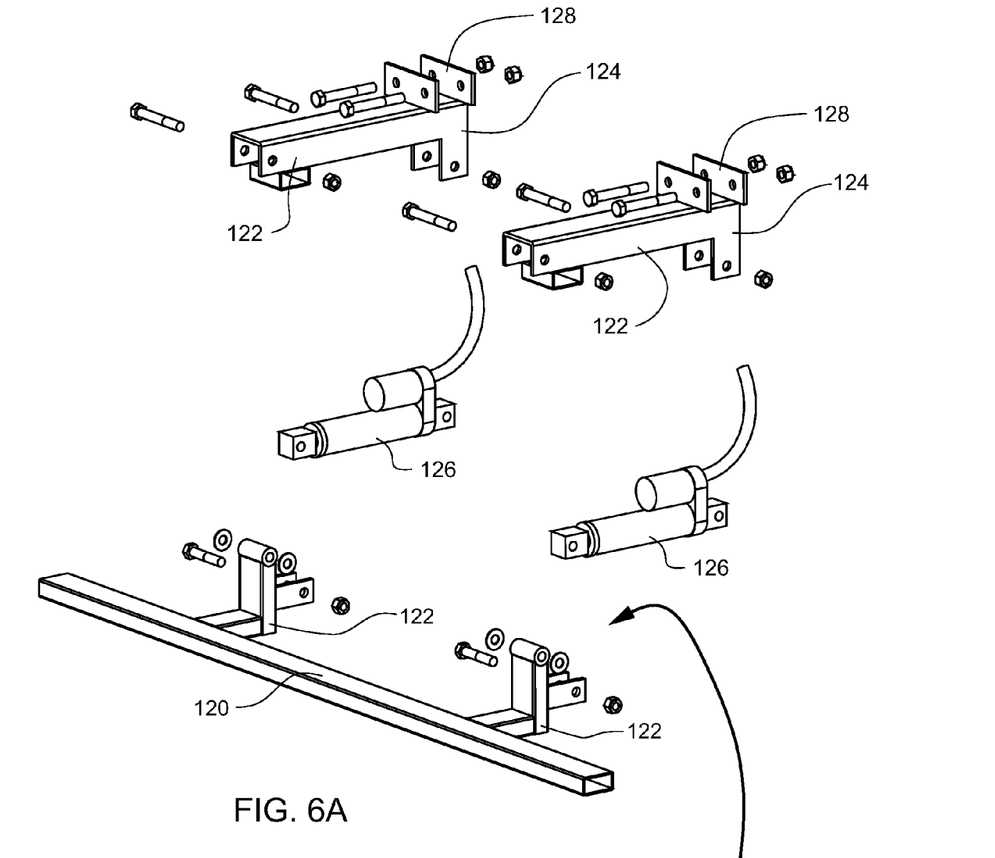
FIG. 6A shows a exploded view of the exemplary step-up protection device.
Figure 6B:
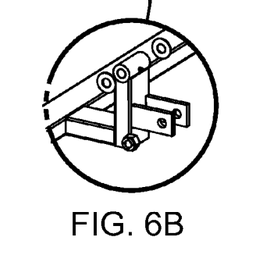
FIG. 6B shows a close-up view of the lift bar pivot connection of the device of FIG. 6A.

FIG. 6A illustrates an exploded view of the exemplary step-up protection device 100. As shown, the step 120 is affixed (e.g., by welding) to an L-shaped lift bar 122. Although the step 120 is shown as a substantially flat, elongated member, it is to be appreciated that the step 120 could be another shape, such as, for example, tubular. The lift bar 122 is pivotally attached to the base 124 on an end. Preferably, the pivotal attachment is accomplished by positioning a bolt through a slot mutual to both the lift bar 122 and the base 124 (for example, as shown in FIG. 6B). Preferably, the bolt is secured using a bolt/washer combination, as shown. Preferably, the actuator 126 is attached to the base 124 on a distal end, preferably, using a set of bolts, as shown. Preferably, the actuator 126 is a linear actuator which is affixed to the lift bar 122, as shown. Preferably, when the actuator 126 is operated the actuator 126 will either push linearly toward the lift bar 122 or linearly away from the lift bar 122. In operation, when the actuator 126 pushes linearly toward the lift bar 122, the lift bar 122 pivots upwardly lifting the step 120, and when the actuator 126 pushes linearly away from the lift bar 122, the lift bar 122 pivots downwardly lowering the step 120. Preferably, each device 100 is attachable to the underside of the motor vehicle using a set of brackets 128.

As mentioned, preferably, the actuator 126 will be a linear actuator. This actuator 126 will include an electric motor powered, preferably, by the battery of the motor vehicle 200. Preferably, the actuator will be driven by mechanical, hydraulic, or pneumatic means. Preferably, a (wired or wireless) controller will be interposed between the battery and the actuator such that a user can control operation of a pair of actuators on a side of the vehicle. For instance, the user would be able to turn on/off the actuators 122, and select whether the actuators 126 will push linearly away from/toward the lift bar 122, causing the step 120 to either to be positioned or retract. Additionally, when the current of the battery is detected as being below a predetermined voltage (e.g., using a voltmeter), circuitry can be configured to cause the actuator 126 to cause the step 120 to assume the step-up position so as not to block the door 150.

Preferably, the materials used for the device 100 can include any number of durable materials, such as stainless steel. The step 120 can include a layer of synthetic rubber or soft plastic material to provide traction. Additionally, the pivotal attachment discussed above (and shown in FIGS. 6A-B) can include nylon (or another low-friction) elements to increase wear life.

Figure 7:
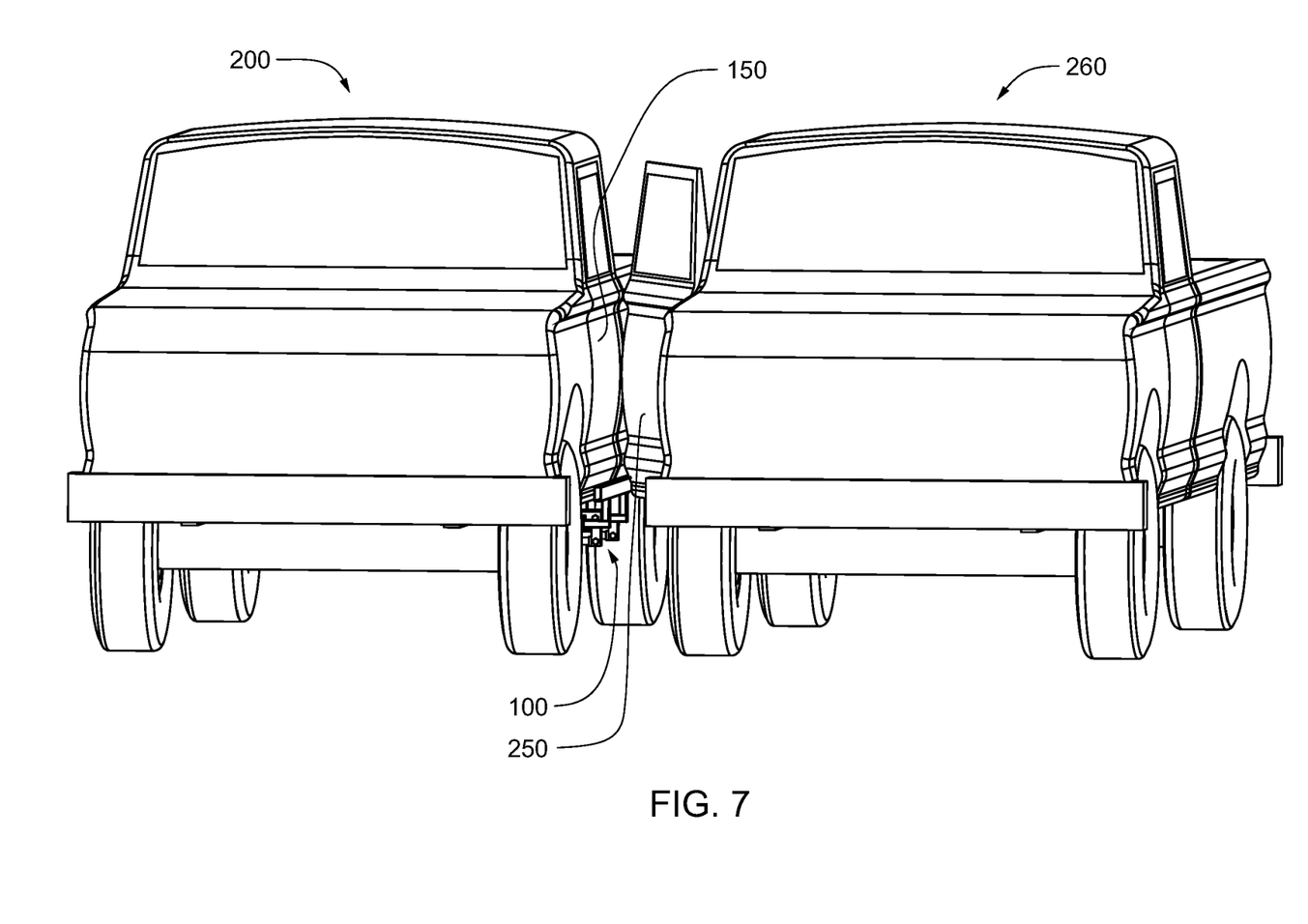
Figures 8A, 8B:
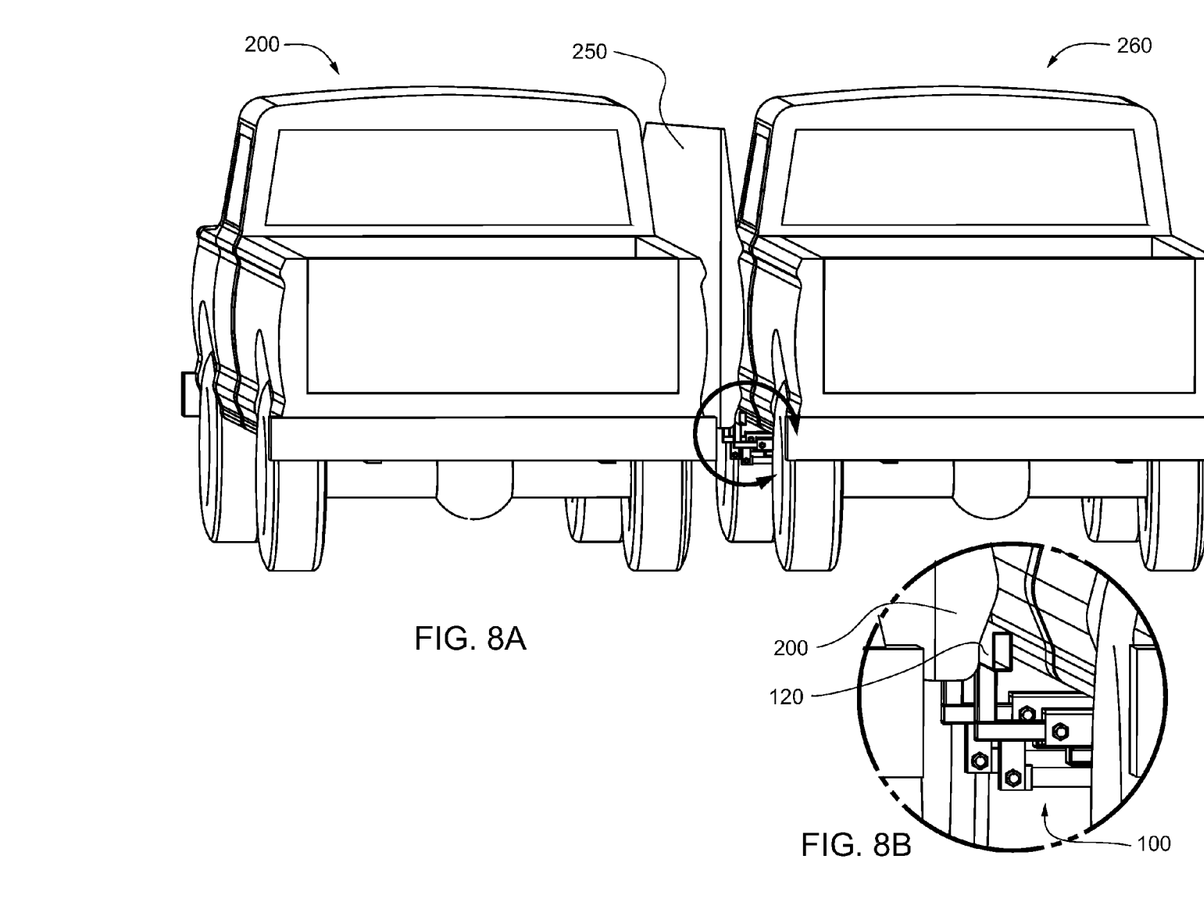

FIGS. 7 and 8A show the device 100 in use to prevent the motor vehicle 200 from being dinged. A vehicle 200 can be dinged when a person opens the door 150 of a neighboring another vehicle 260 and hits the vehicle 200, causing a small dent or scratch. FIG. 8B shows a close-up detail illustrating how the device impedes the vehicle 200 from being dinged.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A device attachable along a side of a motor vehicle, comprising:
   an elongated step; and
   one or more supports,
      wherein each of the one or more supports includes:
         a lift bar;
         a base; and
         an actuator;
         wherein the base holds the actuator and the lift bar is attached to
      the base on a distal end and to the step on an opposite end; and
   a user-controlled controller that operates the actuator, accessible by a user of the motor vehicle, wherein, when the controller is operated directly by the user, depending on selection by the user, the actuator either (1) lowers the lift bar causing the step to be positioned for use or (2) raises the lift bar causing the step to be retracted, and if retracted, the step blocks at least one door of the motor vehicle.

2. The device of claim 1, wherein the lift bar of each of the one or more supports is L-shaped.

3. The device of claim 1, wherein the actuator of each of the one or more supports is an electric actuator.

4. The device of claim 1, wherein the device comprises two supports.

5. The device of claim 1, wherein when the step is positioned for use, the step is substantially level with respect to the ground.

6. The device of claim 1, wherein the base of the one or more supports further includes a bracket for attaching the device to the side of the motor vehicle.

7. The device of claim 1, wherein when the step is retracted, the step impedes damage to the motor vehicle.

8. A kit for installing a step-up protection, comprising:
   an elongated step; and
   one or more supports,
      wherein each of the one or more supports includes the following parts:
         a lift bar;
         a base; and
         an actuator; wherein, when installed, the base holds the actuator and the lift bar is attached to the base on a distal end and to the step on an opposite end; and
   a user-controlled controller that operates the actuator, accessible by a user of the motor vehicle, wherein, when the controller is operated directly by the user, depending on selection by the user, the actuator either (1) lowers the lift bar causing the step to be positioned for use or (2) raises the lift bar causing the step to be retracted, and if retracted, the step blocks at least one door of the motor vehicle.

9. The kit of claim 8, further including a set of brackets.

10. The kit of claim 8, further including a set of instructions.

\* \* \* \* \*